(12) United States Patent
Huang

(10) Patent No.: US 8,863,273 B2
(45) Date of Patent: Oct. 14, 2014

(54) METHOD OF USING AN ACCOUNT AGENT TO ACCESS SUPERUSER ACCOUNT SHELL OF A COMPUTER DEVICE

(75) Inventor: Jing-Kuang Huang, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 107 days.

(21) Appl. No.: 13/361,910

(22) Filed: Jan. 30, 2012

(65) Prior Publication Data

US 2013/0198835 A1    Aug. 1, 2013

(51) Int. Cl.
  *G06F 12/00*    (2006.01)
  *G06F 12/14*    (2006.01)

(52) U.S. Cl.
  USPC .......................................................... 726/19

(58) Field of Classification Search
  None
  See application file for complete search history.

(56) References Cited

U.S. PATENT DOCUMENTS

| 5,552,776 A * | 9/1996 | Wade et al. .................. 340/5.74 |
| 5,953,514 A | 9/1999 | Gochee |
| 2003/0079030 A1 * | 4/2003 | Cocotis et al. ................ 709/229 |
| 2007/0157315 A1 * | 7/2007 | Moran ............................. 726/23 |
| 2008/0046581 A1 * | 2/2008 | Molina et al. ................. 709/229 |
| 2009/0125633 A1 * | 5/2009 | Watsen et al. ................. 709/229 |
| 2009/0271449 A1 * | 10/2009 | Shimosaki et al. ........... 707/202 |
| 2011/0106942 A1 * | 5/2011 | Roskowski et al. ........... 709/224 |
| 2011/0252459 A1 * | 10/2011 | Walsh et al. ....................... 726/4 |
| 2012/0131646 A1 * | 5/2012 | Chandolu et al. ................ 726/4 |
| 2013/0024907 A1 * | 1/2013 | Pal et al. ........................... 726/1 |

OTHER PUBLICATIONS

Davis, R., "Network Authentication Tokes", 1989, IEEE, vol. 2, p. 234-238.*
Shinjo et al., "A Distributed Web Browser as a Platform for Running Collaborative Applications", 2011, IEEE, p. 278-286.*
Hernandez et al., "WebDAV: What It Is, What It Does, Why You Need It", Sep. 2003, IEEE, p. 249-254.*
Satyanarayanan, "Integrating Security in a Large Distributed System", Aug. 1989, ACM, vol. 7 No. 3, p. 247-280.*

* cited by examiner

*Primary Examiner* — Kambiz Zand
*Assistant Examiner* — Demaris Brown
(74) *Attorney, Agent, or Firm* — Winston Hsu; Scott Margo

(57) ABSTRACT

A method of using an account agent to access a superuser account shell of a computer device is disclosed. The method includes receiving an authentication request; verifying whether an identity authentication is passed; when the identity authentication is passed, establishing a secure channel between the account agent and a normal user account shell; and allowing controlling the superuser account shell of the computer device through the normal user account shell.

20 Claims, 3 Drawing Sheets

METHOD OF USING AN ACCOUNT AGENT TO ACCESS SUPERUSER ACCOUNT SHELL OF A COMPUTER DEVICE

BACKGROUND

The present invention relates to a method of accessing a superuser account shell of a computer device, and more particularly, to a method of using an account agent to access a superuser account shell of a computer device.

A user account that identifies a user by a username, a password or other credentials allows the user to login a computer operating system. In a UNIX-based operating system, each user has corresponding user identification (UID) that identifies the user and relates system resources to the user. In many operating systems, a superuser or a root user is a special account used for system administration, which can be corresponding to UID 0. A superuser has all privileges or permissions to all files and programs and can do many things an ordinary user cannot do, such as changing the ownership of files. On the other hand, it is of high risk to use a superuser account since a simple typographical error in entering commands may cause major damage to the operating system. In a Windows-based operating system, there is an administrator, which does not have the complete control as a superuser and only provides greater access which shields the user from most of the pitfalls of full root access.

In computing, a command is a directive to a computer program for performing a specific task. A shell is a command language interpreter and acts as an interface between the user and the kernel (the internal of an operating system), and is commonly categorized into command-line shells and graphical shells. The primary purpose of a shell is to launch programs; however, it frequently has additional capabilities such as viewing the contents of directories.

In the engineering phase of a computer device, e.g. a mobile phone, a tablet, a notebook, etc., engineers can debug the computer device conveniently by a program of a debug version, in which a superuser or administrator account can be used to control the shell of the computer device for debugging. It is easy to remount the partition, read/write/move/copy system files, dump memory, and replace the program image through the program of debug version by using the superuser account.

However, for security reasons, there is no superuser account in a computer device of a ship version (or release version) and only normal user accounts are allowed to control the shell of the computer device, in order to prevent from abuse, misuse, or undesired activities by end-users. Therefore, it is difficult to debug computer devices which are already shipped. For example, the damaged programs cannot be replaced, the memory cannot be dumped, and system files cannot be copied or moved. Even though the superuser account can be used through a complex authentication mechanism, it is still possible to be cracked by hackers and results in the reveal of private user data and confidential program codes.

Thus, there is a need to improve over the prior art to control the shell of the computer device without actually utilizing a superuser account, so as to perform debug works or any other operations conveniently while avoiding security issue.

SUMMARY

It is therefore a primary objective of the claimed invention to provide a method of using account agent to access a superuser account shell of a computer device, for debugging the computer device or performing any other operations on the computer device which is already shipped.

According to an embodiment of the present invention, a method of using account agent to access a superuser account shell of a computer device includes: receiving an authentication request; verifying whether an identity authentication is passed; when the identity authentication is passed, establishing a secure channel between the account agent and a normal user account shell; and allowing controlling the superuser account shell of the computer device through the normal user account shell.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

Figure 1:
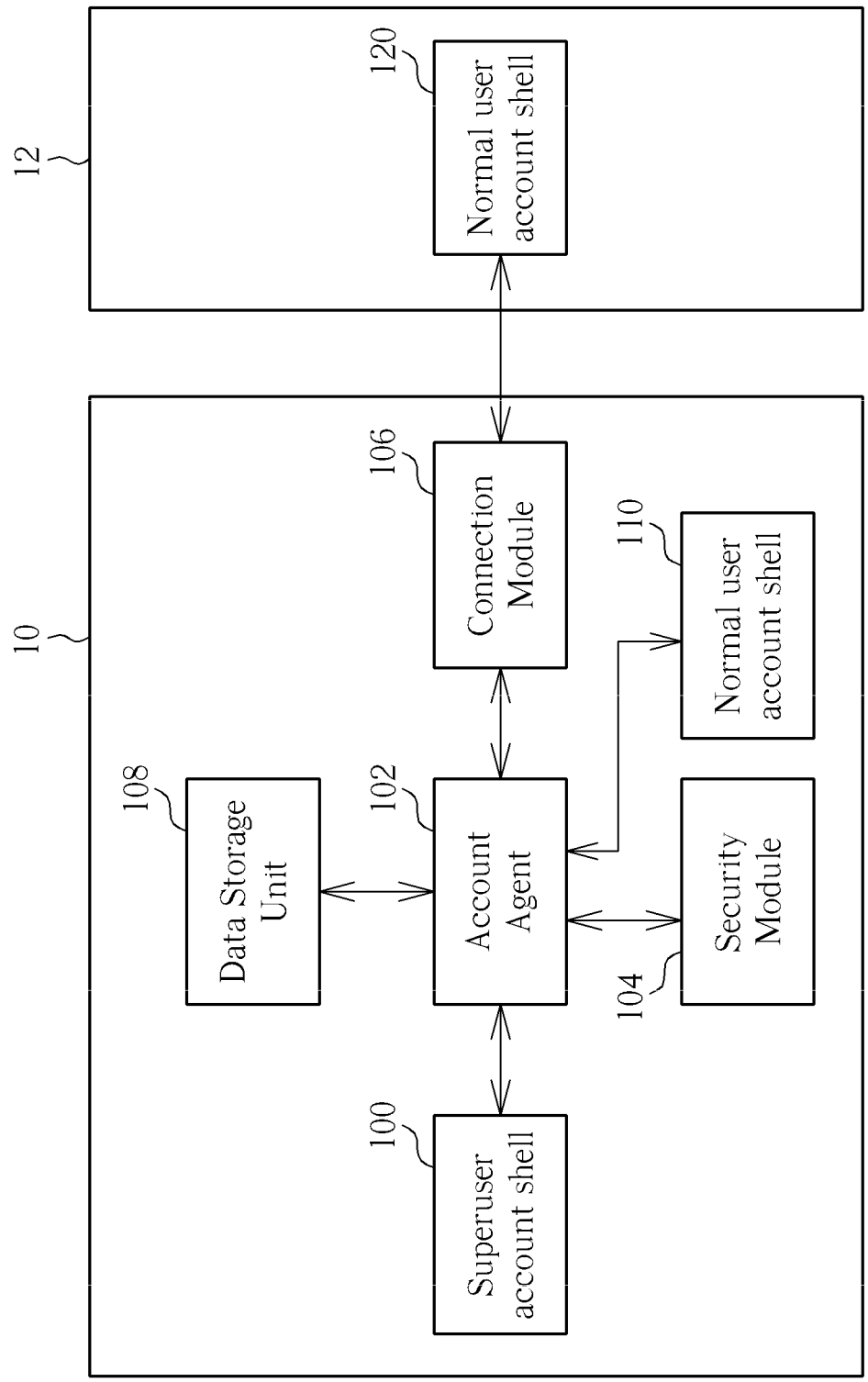
FIG. 1 is a schematic diagram illustrating a computer device according to an embodiment of the present invention.

Please refer to FIG. 1, which includes a schematic diagram of a computer device 10 according to an embodiment of the present invention. The computer device 10 can be a mobile phone, a tablet, a notebook, a portable multimedia player, etc., and can include a superuser account shell 100, an account agent 102, a security module 104, a connection module 106, and a data storage unit 108. The superuser account shell 100, the account agent 102 and the security module 104 can be software implementing one or more processes. However, the components of the computer device 10 can include hardware, firmware, software or a combination thereof. Please note that the computer device 10 can include more components that are not shown in FIG. 1, e.g. CPU, processors, I/O peripherals are well known to those skilled in the art and are omitted herein.

A computer device 12, such as a remote device, can be coupled to the computer device 10 and can be utilized for remotely controlling the computer device 10 through a wired connection, e.g. USB, UART, or Ethernet connection, through a wireless connection, e.g. WLAN, 3G/4G, or Bluetooth connection or any other connection means. The computer device 12 can include a normal user account shell 120, can be a personal computer, a work station, etc., and can be equipped with a larger monitor.

One of the features of the present invention is that the account agent 102 can act as a superuser who logs in the operating system of the computer device 10 with all the administrative privileges. Therefore, a person doing debug/testing works or any other operations for the computer device 10 can use the normal user account shell 120 of the computer device 12 to request the account agent 102 of the computer device 10 to control the superuser account shell 100 to do those an ordinary user account cannot do, e.g. dumping, reloading, or removing data stored in the data storage unit 108. By using the account agent 102 as a superuser account, software/hardware defects on the computer device 10 with a small-size screen can be remotely traced and debugged on the computer device 12 with a larger monitor, which brings convenience for debug works, especially in the condition that the computer device 10 is already shipped to the end-user. Similarly, this invention brings convenience for performing any other operations on the computer device.

Please note that in some embodiments, hardware binding can be applied to the account agent 102 and the hardware, such as a processor, executing the account agent 102 in the computer device 10. That is, in some embodiments, the account agent 102 can only be executed on specific hardware and does not work if it is copied to any other device which is not authorized. Thus, the account agent 102 can be prevented from running on unauthorized devices. Noticeably, in other embodiments, hardware binding may not be applied. Applying hardware binding or not may depend on different design requirements.

The security module 104 can be utilized for establishing a secure channel between the account agent 102 and the normal user account shell 120, so as to perform a secure communication with each other against interception and tampering by a third party. The security module 104 can also be responsible for encrypting/decrypting data passing between the account agent 102 and the normal user account shell 120. For instance, the security module 104 can use a key exchange protocol such as Diffie-Hellman protocol to generate a public key, exchange this public key with the computer device 12 (which also generates its own public key), and thereby generate a shared secret key based on the exchanged public key, which is used for encrypting/decrypting data. When the shared secret key is generated, the secure channel can be established. After that, the security module 104 can encrypt data to be transmitted to the normal user account shell 120 and decrypt received data from the normal user account shell 120 with the shared secret key. That is, data are passing through a secure communication.

The connection module 106 can implement a wired or wireless communication protocol, for establishing a connection between the computer device 10 and the computer device 12 via wired or wireless transport media. The communication protocol implemented in the connection module 106 can be wired, e.g. USB or UART, or wireless, e.g. WLAN, Bluetooth, UWB, and so on. Data generated from the account agent 102 and encrypted by the security module 104 can finally be transmitted by the connection module 106 in a specific type or format (associated with data rate, modulation scheme, etc.) corresponding to the communication protocol applied in the connection module 106.

Noticeably, in the above embodiment, the normal user account shell 120 is in the computer device 12 for remotely controlling the computer device 10. In other embodiments, the computer device 10 can also include a normal user account shell 110 for performing debug works or any other operations by directly utilizing the computer device 10 without the connection established by the connection module 106. Detail operations of the normal user account shell 110 can be similar to those of the normal user account shell 120, and can be derived by referring to the above descriptions related to the normal user account shell 120. As a result, the user can utilize the normal user account shell 110 in the computer device 10 or the normal user account shell 120 in the computer device 12, i.e. the remote device, to perform debug works or any other operations on the computer device 10.

Figure 2:
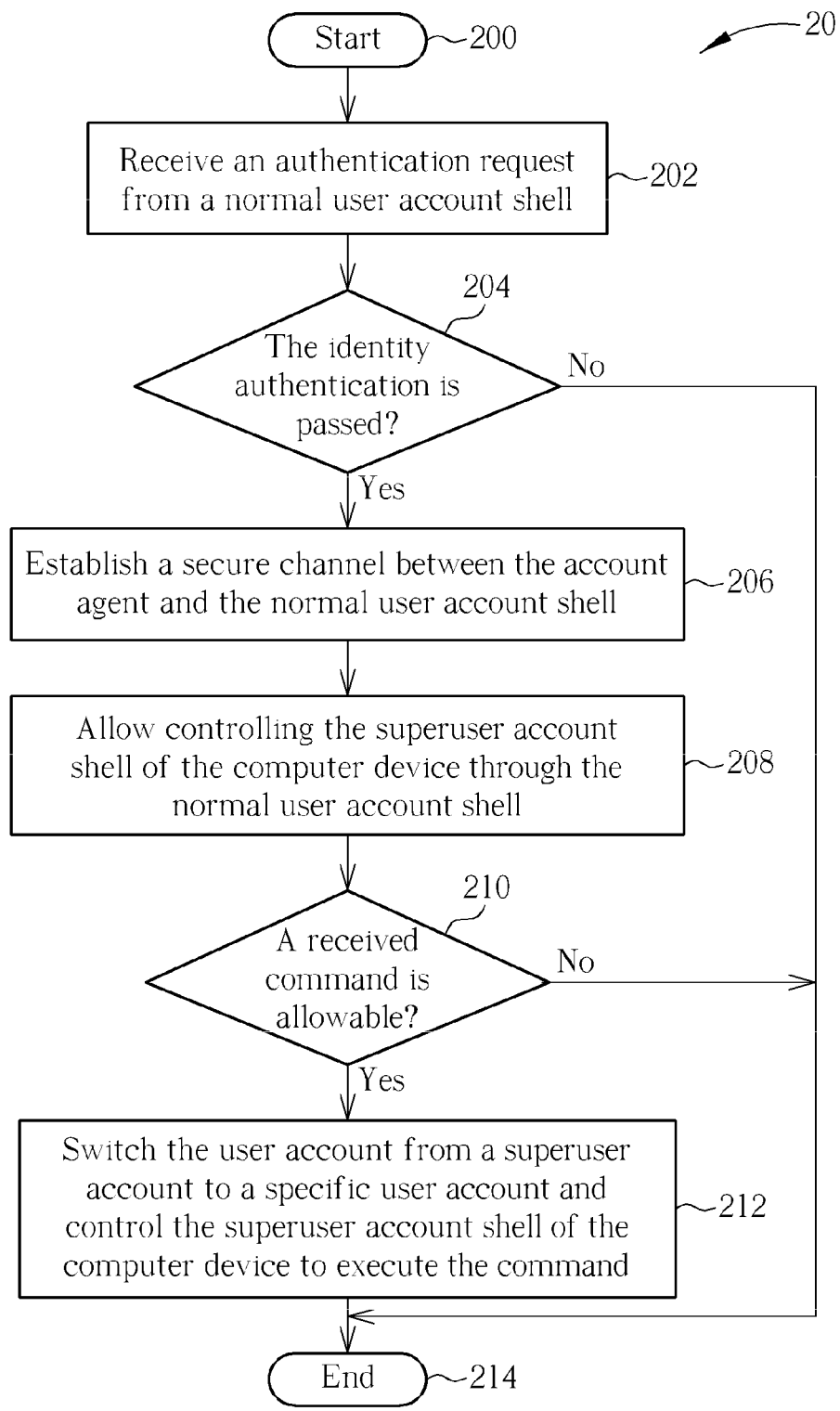
FIG. 2 and FIG. 3 are flowcharts of methods according to embodiments of the present invention.

Please refer to FIG. 2, which is a flowchart of a process 20 according to an embodiment of the present invention. The process 20 is utilized for using an account agent to access a superuser account shell of a computer device. In one embodiment, the computer device can be shipped to the end-user and software version of the superuser account shell is a shipped version, thus a superuser or root account is not allowable, in order to protect private user data or confidential system design information from being stolen. The process 20 can be performed at least partially or wholly by the computer device 10 in FIG. 1. The process 20 includes the following steps:

Step 200: Start.

Step 202: Receive an authentication request from a normal user account shell.

Step 204: Verify whether an identity authentication is passed. If the identity authentication is passed, perform Step 206; else, perform Step 214.

Step 206: Establish a secure channel between the account agent and the normal user account shell.

Step 208: Allow controlling the superuser account shell of the computer device through the normal user account shell.

Step 210: When a command with at least one parameter is received from the normal user account shell, check whether the command is allowable according to a constraint table. If the command is allowable, perform Step 212; else, perform Step 214.

Step 212: Switch the user account from a superuser account to a specific user account and control the superuser account shell of the computer device to execute the command.

Step 214: End.

At the beginning, the computer device 10 can be coupled to a remote device (e.g. through the connection module 106), such as the computer device 12 of FIG. 1. After the connection between the computer device 10 and the remote device is established, the account agent 102 may send a message to the remote device, for indicating that identity authentication is requested. Noticeably, in other embodiments, the computer device 10 can perform the process 20 by itself without coupling to a remote device.

Then, if the account agent 102 receives an authentication request from a normal user account shell, e.g. the normal user account shell 110 of the computer device 10 or the normal user account shell 120 of the computer device 12, the account agent 102 is capable of verifying whether the hardware of the computer device 10 is authorized. In other words, the account agent 102 is capable of checking if hardware binding is applied on the account agent 102 and the hardware of the computer device 10. Noticeably, in other embodiments, the account agent 102 can also verify whether the hardware of the computer device 10 is authorized before receiving an authentication request.

When the account agent 102 is installed in the computer device 10, the account agent 102 can verify that whether the hardware of the computer device 10 is authorized because hardware binding is applied; however, when the account agent 102 is executed on an unknown device, the account agent 102 can find that the hardware of the unknown device is not authorized and stop performing the process 20, which protects the account agent 102 from running on unauthorized device. When the process 20 is stopped, an error message may be sent to the normal user account shell, and the user and/or the remote device can do error handling. Noticeably, in other embodiments, hardware binding may not be applied. Applying hardware binding or not may depend on different design requirements.

When the account agent 102 verified that the hardware of the computer device is authorized, according to Step 204, the account agent 102 is capable of verifying whether the identity authentication is passed or failed according to the received authentication request. The authentication request can include an username, a password, a certificate or a combination thereof. The certificate can be signed by a vendor of at least a portion of the computer device. Moreover, since the certificate may be stored in the remote device and may be stolen, the authentication request can include both username/password and the certificate for a higher security level.

When the identity authentication is passed, according to Step 206, the account agent 102 is capable of controlling the security module 104 to establish a secure channel between the account agent 102 and the normal user account shell, e.g. the normal user account shell 110 of the computer device 10 or the normal user account shell 120 of the computer device 12, so as to perform a secure communication. The security module 104 is capable of establishing the secure channel according to a key exchange protocol, as mentioned previously. The key exchange protocol can conform to a Diffie-Hellman protocol The account agent 102 may transmit a message to the normal user account shell to indicate that the secure channel is ready and commands to the superuser account shell of the computer device 10 are welcome. On the other side, when the identity authentication is failed, the process 20 can be stopped and an error message may be sent to the normal user account shell.

When the secure channel is established, according to Step 208, the account agent 102 is capable of allowing controlling the superuser account shell of the computer device 10 by using a superuser account. That is, the account agent 102 can act as the superuser account. Therefore, a person using an ordinary user account on the normal user account shell can request the account agent 102 to control the superuser account shell 100 as the superuser does.

The user of the normal user account shell can send a command with at least one parameter and/or a user identification (UID), which means that the command is going to be executed by a desired user account corresponding to the UID. For example, the superuser account can be corresponding to UID 0, and an ordinary user account of username "abc" can be corresponding to UID 100. The at least one parameter with the command can be, for example, paths related to data, such as /dev/passwd or /data/user/profile as used in a UNIX shell. In another embodiment, parameters can also include paths related to executable files. Any other commands can also be executed with this invention. For example, the command can also be a change file mode command for changing authority of files wherein the at least one parameter can be a file path and a mode, or the command can be a touch file command for updating the time of a file, i.e. the time of the file is updated when the file is touched, wherein the at least one parameter can be a file path.

Step 210 and Step 212 are used for executing command by a desired user account. According to Step 210, when the account agent 102 receives a command with at least one parameter and/or a specific UID from the normal user account shell, the account agent 102 is capable of checking whether the command is allowable according to a constraint table. The constraint table can be stored in the data storage unit 108, and can include at least one UID and/or accessibility of at least one path by at least one UID. For example, all UIDs, even UID 0, cannot access the path /dev/secret, in which confidential information can be stored; UIDs larger than 100 cannot access the path /data/user/profile, which means UIDs between 0 and 100 can access the path /data/user/profile; UIDs larger than 0 cannot access the path /dev/passwd, which means that only UID equal to 0, such as the superuser account, can access the password. Based on the above exemplary constraint table, when the account agent 102 receives a command with the path /data/user/profile and UID 50, the account agent 102 is capable of checking this command and knowing it is allowed; or, when the account agent 102 receives the same command with the same path and UID 150, the account agent 102 is capable of checking this command and knowing it is not allowed.

Please be noted that the superuser account can be the initial user account on the superuser account shell 100 when the account agent 102 receives the first command through the secure channel, and in some embodiments, the specific UID is not necessarily required since some devices may only have one user ID. When the account agent 102 knows that the received command is allowable, according to Step 212, the account agent 102 is capable of switching the user account from the superuser account to a specific user account given with the command, and controlling the superuser account shell of the computer device 10 to execute the command by using the specific user account. By Step 212 of user changing, the superuser account shell 100 of the computer device 10 can be controlled by the desired user account with the limited privileges than the superuser account since the account agent 102 can determine whether a command is allowable according to the specific user account given with the command and the constraint table, which protects private user data on the computer device 10 from being modified or copied during debug works or any other operations. As a result, the present invention can control the superuser account shell 100 of the computer device without actually utilizing a superuser account, so as to perform debug works or any other operations conveniently while avoiding security issue.

In addition, after the command is executed, the user account can switch from the specific user account to the superuser account. In another embodiment, the user of the normal user account shell does not have to assign the UID with commands if the desired user accounts are the same for successive commands; the desired user account can be changed first, and after that, the account agent 102 knows that commands without accompanying UID are executed under the same user account.

The constraint table can be modified. Please refer to FIG. 3, which is a flowchart of a process 30 according to an embodiment of the present invention. The process 30 can be utilized for configuring the constraint table and can be performed at least partially or wholly by the computer device 10 in FIG. 1. The process 30 includes the following steps:

Step 300: Start.

Step 302: Receive an authentication request from a normal user account.

Step 304: Verify whether an identity authentication is passed. If the identity authentication is passed, perform Step 306; else, perform Step 312.

Step 306: Establish a secure channel between the account agent and the normal user account shell.

Step 308: Receive an encrypted setting value of a constraint table and save the encrypted setting value of the constraint table.

Step 310: Decrypt the encrypted setting value of the constraint table with a device root key.

Step 312: End.

Secure communication is also required for the constraint table modification, and thus Step 302 to Step 306 are similar to Step 202 to Step 206 of the process 20, which are not repeated herein. Please note that the authentication request in the process 30 could be more critical than that in the process 20 because the constraint table is highly associated with data privacy of the end-user. The authentication request in the process 30 can be a register setting, which can be done by changing hardware setting of a computer device; or, the authentication request in the process 30 can be a certificate different from the certificate used in the process 20, which can provide a higher security level than the certificate in the process 20.

Figure 3:
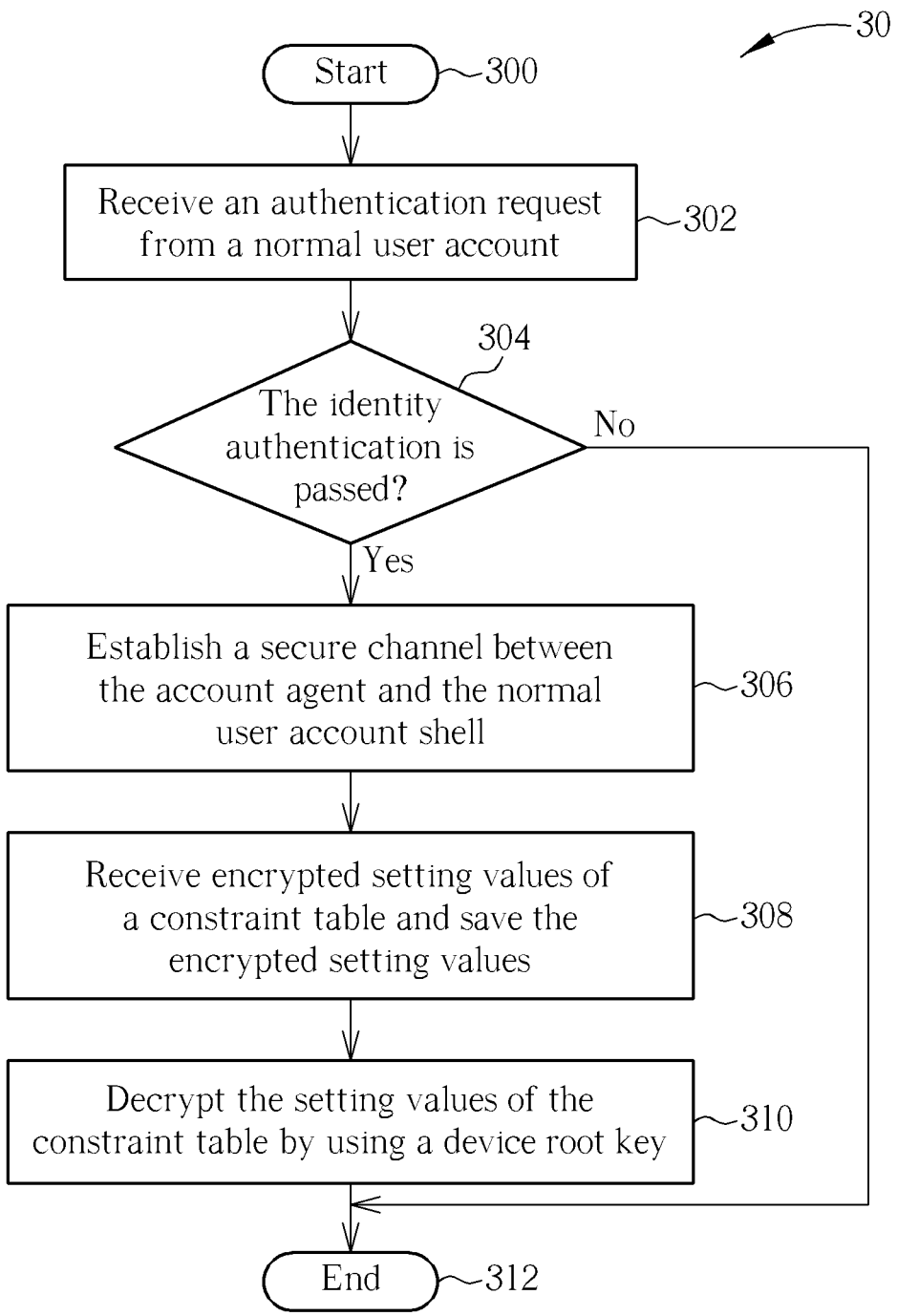

Please note that, the steps and the orders of steps I FIG. 2 and FIG. 3 are illustrative only. The steps can be omitted or performed in different orders according to different design requirements.

On the normal user account, a device root key, which is unique for each computer device, can be used to encrypt at least one setting value of the constraint table. The device root key can be stored in the computer device and can also be known by the vendor of the computer device. If the secure channel is established, according to Step 308 and Step 310, the account agent 102 is capable of receiving the at least one encrypted setting value of the constraint table from the normal user account, and saving the encrypted setting value to the data storage unit 108, which means the setting value can be stored securely. The account agent 102 is capable of using the device root key to decrypt the encrypted setting value of the constraint table, and reloading the setting value to update the constraint table. The decryption and reloading of the setting value can be performed when the computer device boots up. Briefly, the setting value can be transmitted through the secure channel, and the setting value can be stored securely since they are encrypted with the device root key.

In conclusion, when the computer device including the account agent is already shipped to the end-user and the end-user cannot use a superuser account on the computer device, the person doing debug works or any other operations can control the account agent to act as the superuser account to access the superuser account shell of the computer device. As a result, debug works or any other operations for the computer device already shipped is performed conveniently, and data privacy of user data in the computer device is also improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of using an account agent to access a superuser account shell of a computer device, comprising:
   receiving an authentication request;
   verifying whether an identity authentication is authenticated;
   when the identity authentication is authenticated, establishing a secure channel between the account agent and a normal user account shell; and
   allowing controlling the superuser account shell of the computer device through the normal user account shell without changing into the superuser account shell.

2. The method of claim 1 further comprising:
   when a command with at least one parameter is received from the normal user account shell after the secure channel is established, checking whether the command is allowable according to a constraint table; and
   switching from a superuser account to a specific user account and controlling the superuser account shell of the computer device to execute the command.

3. The method of claim 2, wherein the constraint table comprises accessibility of at least one path by at least one user account.

4. The method of claim 2 further comprising:
   switching back to the superuser account after the command is executed.

5. The method of claim 1 further comprising:
   verifying whether a hardware of the computer device is authorized.

6. The method of claim 1, wherein the authentication request comprises an username, a password, a certificate or a combination thereof.

7. The method of claim 6, wherein the certificate is signed by a vendor of at least a portion of the computer device.

8. The method of claim 1, wherein the secure channel is established based on a key exchange protocol.

9. The method of claim 8, wherein the key exchange protocol conforms to a Diffie-Hellman protocol.

10. The method of claim 1 further comprising:
    when an encrypted setting value of a constraint table is received after the secure channel is established, saving the encrypted setting value of the constraint table, wherein the constraint table comprises accessibility of at least one path by at least one user account; and
    decrypting the encrypted setting value with a device root key.

11. The method of claim 10, wherein the step of decrypting the encrypted setting value with the device root key is performed after the computer device boots up.

12. The method of claim 10, wherein the authentication request comprises a certificate.

13. The method of claim 12, wherein the certificate is signed by a vendor of at least a portion of the computer device.

14. The method of claim 10, wherein the authentication request comprises setting of a register of the computer device.

15. The method of claim 10, wherein the device root key is stored in the computer device.

16. The method of claim 1, wherein the authentication request is sent from the normal user account shell.

17. The method of claim 5, wherein the step of verifying whether the hardware of the computer device is authorized comprises checking if hardware binding is applied on the account agent and the hardware of the computer device.

18. The method of claim 1, further comprising transmitting a message to the normal user account shell after allowing controlling the superuser account shell of the computer device through the normal user account shell.

19. The method of claim 18, wherein the message indicates that the secure channel is ready.

20. The method of claim 18, wherein the message indicates that a command to the superuser account shell of the computer device is welcome.

* * * * *